Dec. 6, 1938.  A. W. WIGGLESWORTH  2,139,397
MOTOR DRIVEN HEADSTOCK FOR MACHINE TOOLS
Filed Sept. 8, 1936  4 Sheets-Sheet 1

Inventor:
Albert W. Wigglesworth,
By Bertha L. MacGregor
Attorney

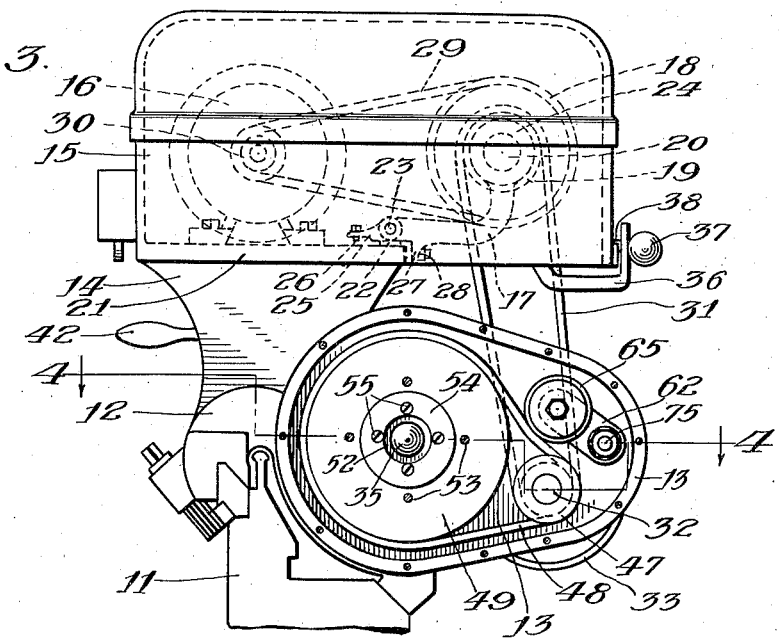
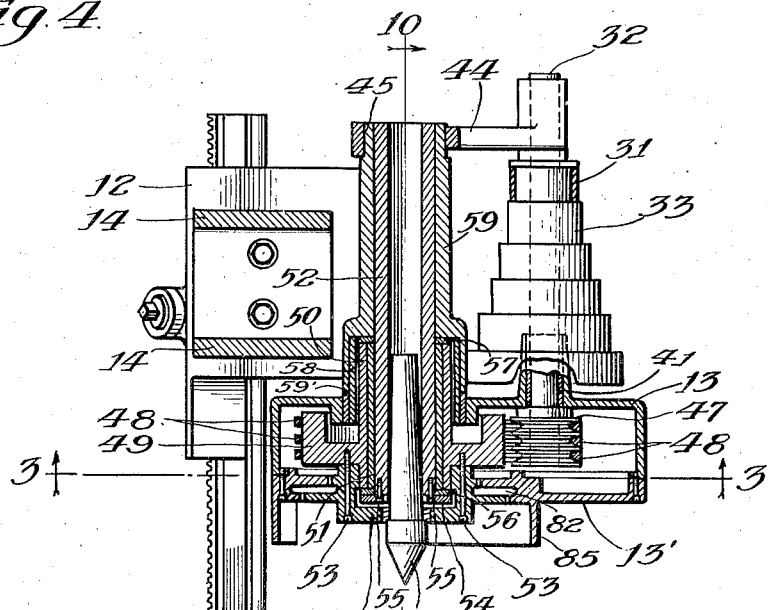

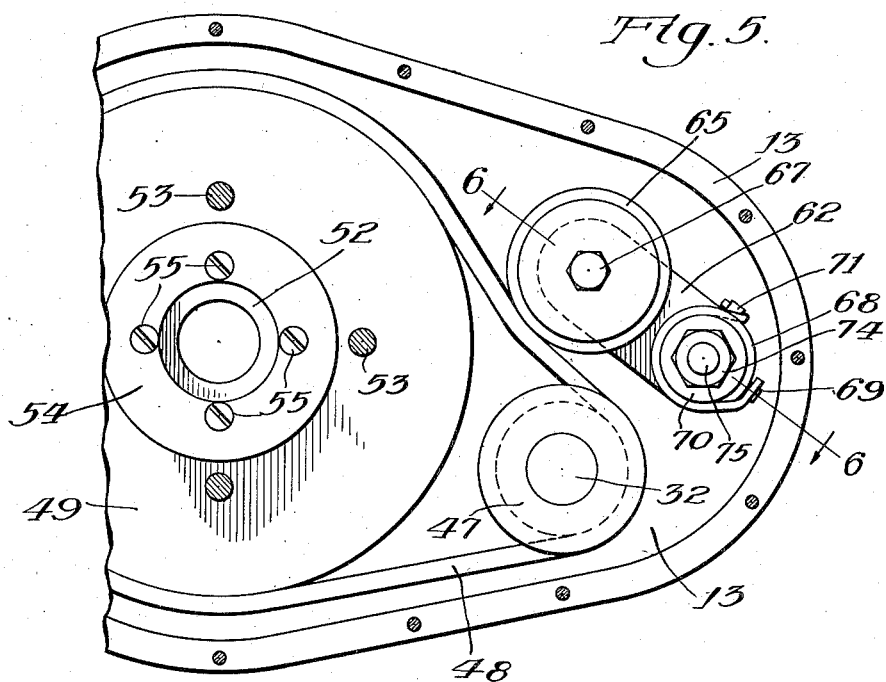
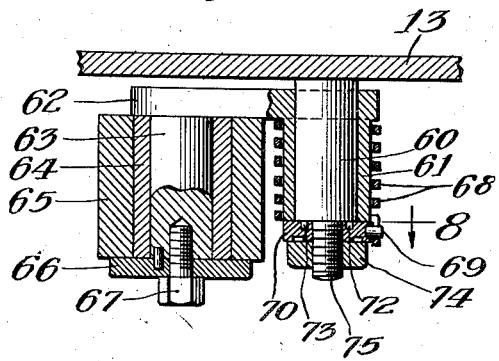
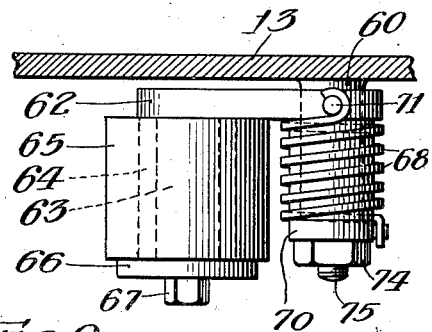
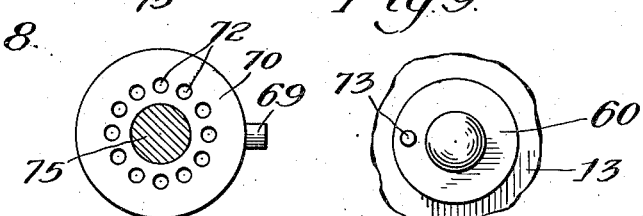

Dec. 6, 1938.    A. W. WIGGLESWORTH    2,139,397
MOTOR DRIVEN HEADSTOCK FOR MACHINE TOOLS
Filed Sept. 8, 1936    4 Sheets-Sheet 4

Inventor:
Albert W. Wigglesworth,
By: Bertha L. MacGregor
Attorney.

Patented Dec. 6, 1938

2,139,397

UNITED STATES PATENT OFFICE 2,139,397

MOTOR DRIVEN HEADSTOCK FOR MACHINE TOOLS

Albert W. Wigglesworth, Chicago, Ill., assignor to Hill-Clarke Machinery Co., Chicago, Ill., a corporation of Illinois Application September 8, 1936, Serial No. 99,761

4 Claims. (Cl. 51—237)

This invention relates to motor driven headstocks for machine tools, such as grinding machines and the like.

The main object of the invention is to provide operative connections between the motor and the work engaging member whereby vibration is substantially eliminated and perfectly smooth surfaces are imparted to the work being machined. This object is best accomplished by providing a belt drive for rotating the work engaging member. Preferably a rubber belt or a plurality of rubber belts are used. Since oil deleteriously affects rubber, it is essential that the belt or belts be kept free of grease and oil, and, therefore, an object of the invention is to provide oilless bearings for the belt-driven mechanism. Such oilless bearings are injuriously affected by the water used in the operation of some machine tools, such as grinding machines and the like, and, therefore, another object of the invention is to provide means for preventing water from entering the housing which preferably encloses the driving mechanism or from otherwise coming in contact with said bearings. Reference is made to my co-pending application Serial No. 119,919 in which is claimed the means for protecting the drive from moisture.

Another object is to provide adjustable means for automatically maintaining desired tension on the drive belt which operates the work engaging member. Preferably the adjusting means are enclosed so as to avoid unintentional alteration of the tension or unnecessarily frequent adjustments.

In the drawings:

Fig. 3 is a vertical sectional view, partly in elevation, taken in the plane of the line 3—3 of Figs. 1 and 4.

Fig. 4 is a horizontal sectional view taken in the plane of the broken line 4—4 of Fig. 3.

Fig. 5 is an enlarged view of a part of Fig. 3.

Fig. 6 is a sectional view taken in the plane of the line 6—6 of Fig. 5.

Fig. 7 shows in elevation the parts shown in section in Fig. 6.

Fig. 8 is an enlarged sectional view of a detail taken in the plane of the line 8—8 of Fig. 6.

Fig. 9 is an enlarged elevation of the end of the stub shaft shown in Fig. 8, with certain parts removed.

Figure 1:
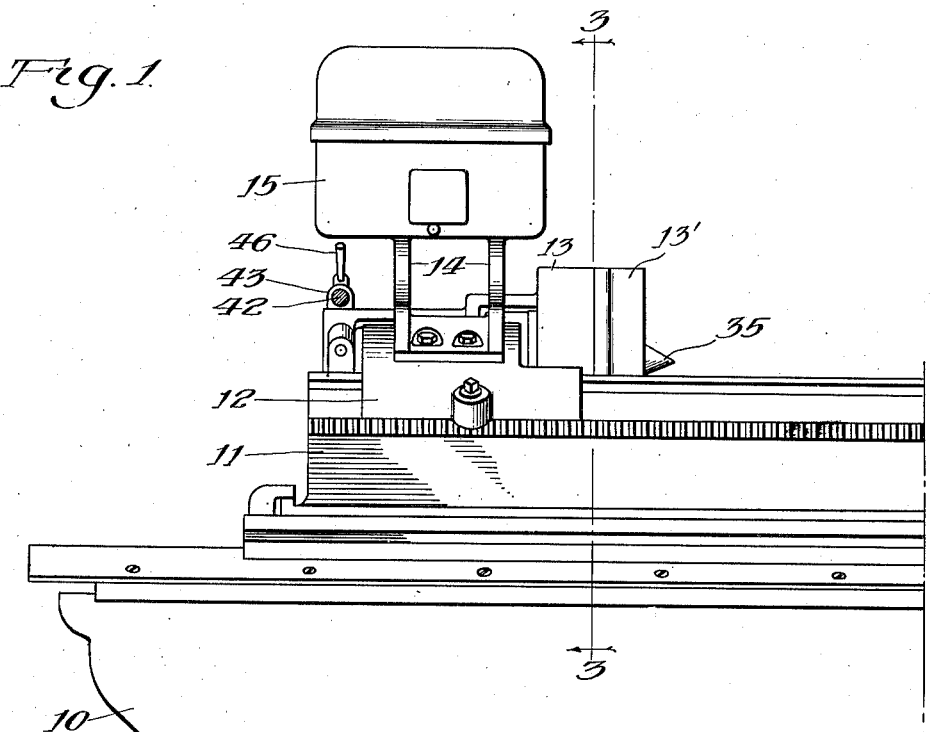
Fig. 1 is a front elevation of one end of a grinding machine having a motor driven head stock embodying my invention.

In that embodiment of my invention shown in the drawings, the base 10 of the machine supports a longitudinally slidable work carriage 11 on one end of which is carried the headstock which cooperates with a tailstock, not shown, to support the work.

The headstock comprises a lower housing consisting of parts 12, 13 and 13', two supports 14, 14 connected to the part 12 of the housing, and a two-piece upper housing 15 on the supports 14. In the upper housing 15 are mounted a motor 16, pulley supporting frame 17, and a grooved pulley 18 and plain wide pulley 19 on a shaft 20. The motor 16 is fixedly mounted on the floor 21 which partially closes the bottom of the housing 15. Spaced apart brackets 22 on the floor 21 support a horizontal shaft 23 on which is pivotally mounted the frame 17. The upwardly curved arms 24 of the frame 17 are apertured at their upper ends for the reception of the pulley shaft 20 rotatably mounted therein. The pulley 18 is fixed on one end of the shaft 20 and the wide pulley 19 is fixed to said shaft between the arms 24 of the frame 17. One of the arms of the frame 17 is extended beyond the shaft 23 as indicated at 25 and is apertured to receive an adjusting screw 26. A depending lug 27 on said arm is apertured for the reception of an adjusting screw 28. The adjustment of the screws 26 and 28 in the end 25 and lug 27, respectively, with their ends bearing on the floor 21 of the housing, swings the frame 17 relatively to the shaft 23 and thus varies the position of the pulley 18 for the purpose of adjusting the tension of the belt 29.

The belt 29 on the pulley 30 of the motor shaft transmits power from the motor 16 through pulley 18 to shaft 20. A belt 31 on the wide pulley 19 on said shaft 20 extends through the open bottom of the housing 15 and transmits power to the drive shaft 32 through the speed-change pulley 33 on said shaft 32. The shaft 32 is operatively connected with a workholder 34 by operative connections hereinafter described. The headstock center is indicated at 35.

The speed change is accomplished by moving the belt 31 longitudinally of the wide pulley 19 and stepped or cone pulley 33. For this purpose I have provided a forked slide member 36 through which one lap of the belt 31 extends. The member 36 is slidably mounted on a rod or shaft (not shown) in the housing 15, parallel with the pulley shaft 20, and has a handle 37 on its outer face and a pin 38 adapted to engage notches 39 in a bar 40 fixed to the housing 15. By tilting the slide member 36 it may be disengaged from one of the notches 39 in the bar 40 and be moved longitudinally of the bar to another notch.

Figure 2:
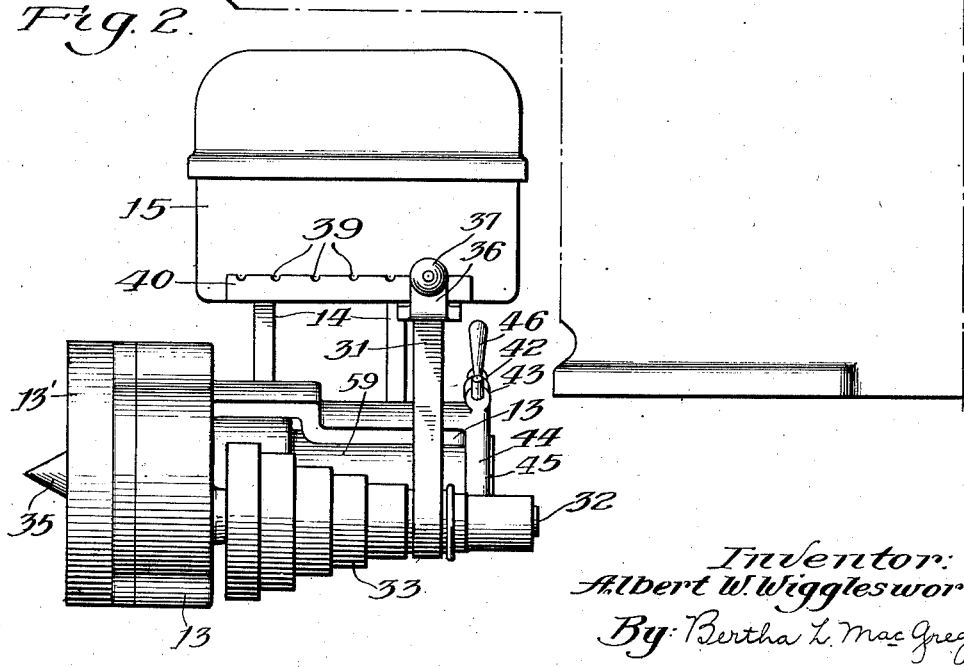
Fig. 2 is a rear elevation of the head stock.

In order to permit the belt 31 to be moved by actuation of the slide member 36, it is necessary to relieve the belt 31 of tension and this is accomplished by pressing downwardly on a lever 42 rigidly connected to the part 43 of the housing 13 and arm 44, said housing 13 and arm 44 being pivotally mounted on the shaft end 45 which is in alignment with the center 35. The arm 44 terminates in a bearing for the shaft 32. The downward actuation of the lever 42 and pivotal movement of the arm 44 (the latter being pivotally connected with shaft 32), raises the shaft 32, housing 13 and the change-speed pulley 33 and relieves the belt 31 of tension, so that it may be moved on the pulleys 19 and 33 to vary the speed of the shaft 32. When the lever 42 is released after adjustment of the belt 31 on pulleys 19 and 33, the pulley 33 with shaft 32 and associated housing 13 move by gravity to the position shown in Figs. 2 and 3 in which the belt 31 is under proper tension for operating purposes. The handle 46 is a locking device for preventing unintended movement of the lever 42, arm 44 and shaft 32, and must be released before the lever 42 can be depressed.

Reverting to the operative connections between the shaft 32 and the workholder 34 (Figs. 3 to 9, inclusive), one end of the shaft 32 is mounted in an oilless bearing 41 and carries a pulley 47 which, preferably is a multi-grooved type pulley, connected by a plurality of belts 48 to a pulley 49. The pulley 49 has an integral elongated bearing sleeve 50 which surrounds an oilless bearing 51 on the hollow stationary shaft 52 in which the center 35 is mounted. In the present embodiment the center 35 is stationary and the workholder 34 is rotated about the shaft 52, but obviously the center 35 could be rotatably connected if desired. The workholder 34 is secured by bolts 53 to the pulley 49 as best shown in Figs. 3, 4, 10 and 11. A flat apertured disc 54 is secured to the end of the shaft 52 by bolts 55 for retaining an oilless washer 56 in place adjacent the forward ends of the pulley sleeve 50 and bearing 51. Another oilless washer 57 is interposed between the other ends of the bearing 51 and pulley sleeve 50 and an offset shoulder formed in the sleeve 59 which houses the shaft 52 and is part of the fixed housing 12. A bearing sleeve 58 is located between the pulley sleeve 50 and the sleeve 59, and between the pulley sleeve 50 and a member 59' which moves with the movable housing 13—13'.

In the present embodiment the pulley 49 with its sleeve 50 and connected workholder 34 rotate about the fixed shaft 52. Normally during such operation, the housing 13 and member 59' are stationary but when it is desired to change the speed of the shaft 32, the lever 42 may be depressed, whereby the arm 44 and housing 13—13' with member 59' are pivotally moved about the end 45 of the shaft housing 59 and the bearing 58, thereby lifting the drive shaft 32 and change speed pulley 33 to permit movement of the belt 31 on the pulley 33.

The belts 48 preferably are held under proper adjustable tension on the pulleys 47 and 49 by means best shown in Figs. 3 and 5 to 9, inclusive.

A stub shaft 60 is rigidly secured to the housing 13. Said shaft is surrounded by a sleeve 61 which is part of an arm 62, and the arm 62 carries a shaft 63 parallel with the stub shaft 60. An oilless bearing 64 surrounds the shaft 63, between an idler pulley 65 and said shaft 63. Said parts are held in assembled relation by a washer 66 and bolt 67. The arm 62 and sleeve 61 are rotatable relatively to the shaft 60.

A heavy coiled spring 68 surrounds the sleeve 61 on the shaft 60, one end of the spring engaging the pin 69 on the disc 70 and the other end engaging the pin 71 on the arm 62 in such manner that the pulley carrying end of the arm 62 is urged downwardly. Said disc 70 has a plurality of recesses 72 in that face which abuts the end of the shaft 60 and sleeve 61. The recesses are adapted to receive the pin 73 on the end of the shaft 60. A nut 74 and bolt 75 retain the disc 70 in position adjacent the end of the shaft 60. The disc 70 is positioned in abutting relation to the end of the shaft 60, with the pin 73 engaging one of the recesses 72 for the purpose of retaining the disc in a selected position which will place desired tension on the spring 68, and then the nut 74 is tightened to hold the disc in the selected position, in abutment with the shaft end. By adjusing the tension of the spring 68 in the manner described, the positions of the arm 62 and its pulley 65 are controlled. The pulley 65 thus bears on the belts 48 to a desired controlled degree to keep said belts under proper driving tension for driving the pulley 49 to which the workholder is attached.

Figure 10:
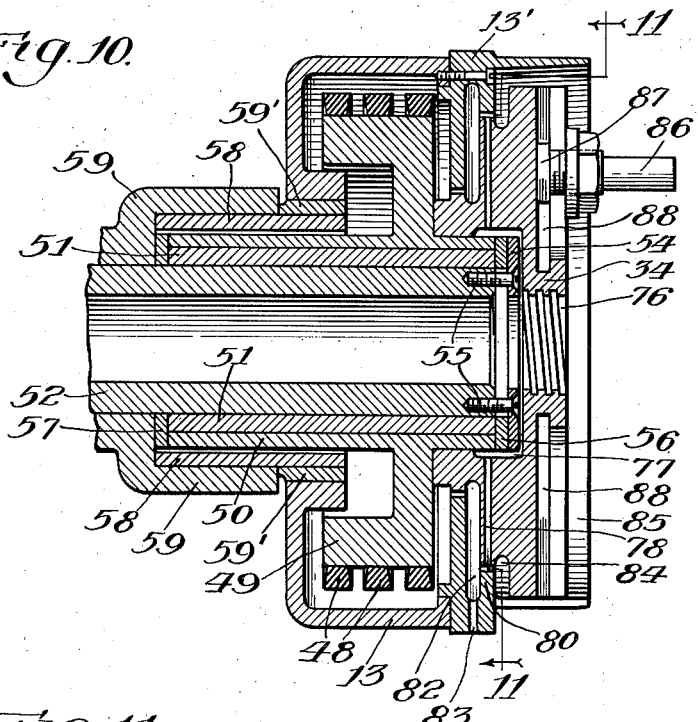
Fig. 10 is an enlarged vertical sectional view taken in the plane of the line 10—10 of Fig. 4, with the center head removed.
Figure 11:
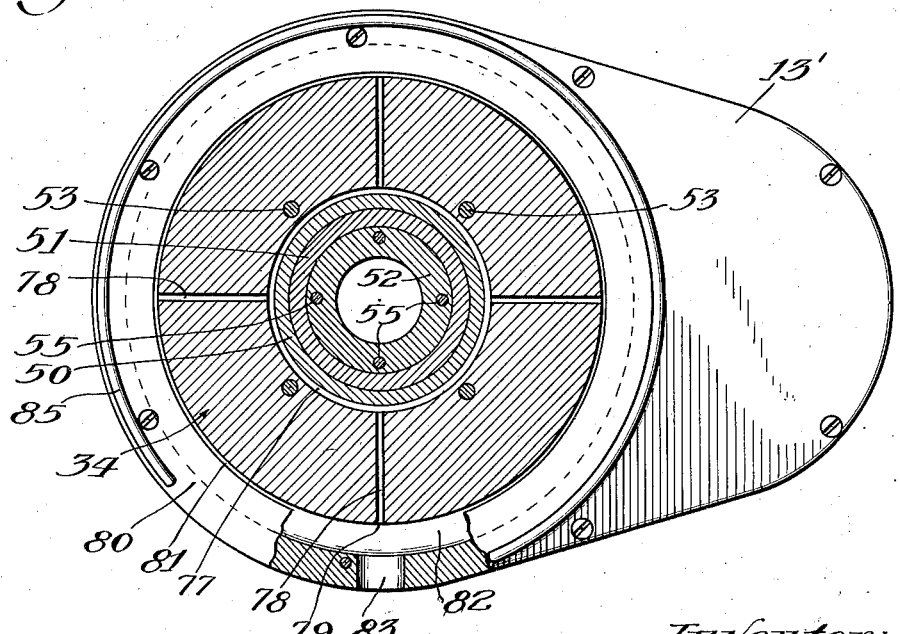
Fig. 11 is a transverse, vertical sectional view, partly in elevation, taken in the plane of the line 11—11 of Fig. 10.

All the bearings in the housing 13—13' are oilless, as heretofore described, and thus the rubber belt or belts 48, which I preferably use, cannot be deleteriously affected by oil. However, to avoid injury to the oilless bearings, contact with moisture must be avoided, and to this end means for preventing water from entering the housing or otherwise contacting the bearings are provided. Said means are best shown in Figs. 10 and 11, in which the work holder 34 is shown in two vertical sectional views at right angles to each other, and with the center head 35 removed. Water is most likely to enter the housing through the opening 76 which is partially closed by the headstock center 35. Said opening communicates with an annular space 77 between the workholder 34 and the forward part of the pulley sleeve 50, the disc 54 and outer edge of the washer 56. The workholder 34 has a plurality of radially extending passageways 78 in its body, communicating with said annular space 77, and extending to the peripheral edge 79 of the workholder. The edge 79 fits within the inwardly directed flange 80 of the housing 13, but the annular space 81 between the workholder edge 79 and housing flange 80 is sufficient to allow water to pass from the passageways 78 through said space 81 to a recess 82 in the housing 13 and thence out through the slot 83, or to pass from the passageways 78 through the space 81 and out through the peripheral recess 84 in the workholder. It will be noted that the flange 85 on the face of the part 80 of the housing 13' is cut away at the lower part of said housing (Figs. 4 and 11) so that water which may enter the opening 76 in the housing may pass out through the surface of the groove or recess 84 without interference by the flange 85. By providing the communicating passageways 77, 78, 81, leading out through 82 and 83 or 84, moisture is kept away from the oilless bearings in the driving mechanism, and injury to said bearings is avoided. Thus I am enabled to use a rubber belt or belts to drive the pulley 49 and attached workholder 34 without subjecting such belt or belts to oil or grease which would render them useless in a very short time.

In Fig. 10 is shown a bolt 86 with square head 87 located in one of two slots 88 in the face of the workholder, for use in connecting the work to the holder.

Of course, it will be understood that either of the pulleys 47 and 49 may be grooved or plain, and that a single or multi-belt drive may be used.

The means shown for adjusting the tension on the idler pulley 65 bearing on the belts 48 are preferred, but other adjusting means may be used without departing from the invention. Preferably the adjusting means are enclosed as herein shown, but this is not essential to the invention.

The elimination of gears and provision of the driving means herein described enable the machine to produce exceptionally smooth work.

Changes may be made in details of construction without departing from the scope of my invention and I do not intend to be limited to the exact form shown and described, except as set forth in the appended claims.

I claim:—

1. A motor driven headstock for grinding machines comprising a normally sealed housing, a center head shaft fixedly mounted in the housing, an oilless bearing on the center head shaft, a pulley rotatably mounted on said bearing, a work-engaging member fixed to and rotatable with the pulley, a drive shaft extending into the housing, an oilless bearing between the drive shaft and housing, a pulley fixed to said drive shaft within the housing, a molded, jointless continuous rubber belt having a smooth uninterrupted inner surface connecting the pulleys on the drive shaft and on the center head shaft, means attached to the housing and closed by the housing for bearing on said belt and automatically controlling the tension of the belt, and a cover for closing the housing.

2. A motor driven head stock for grinding machines having a longitudinally movable work carriage, said headstock comprising a housing, stationary on the carriage and arranged to travel with the carriage, a center head mounted in said housing, a housing pivotally movable about the axis of said center head, a motor supported by the stationary housing, a drive shaft, operative connections between the motor and drive shaft, an arm pivotally connecting the drive shaft to said stationary housing, the drive shaft being rotatably mounted in said movable housing, a speed-change pulley on the drive shaft externally of the movable housing, a pulley on the drive shaft within the movable housing, a work-engaging member and attached pulley in the movable housing rotatable about the axis of the center head, and a belt connecting the pulley on the drive shaft with the pulley attached to the work-engaging member.

3. A motor driven head stock for grinding machines having a longitudinally movable work carriage, said head stock comprising a housing stationary on the carriage and arranged to travel with the carriage, a center head mounted in said housing, a housing pivotally movable about the axis of said center head, a motor supported by the stationary housing, a drive shaft, operative connections between the motor and drive shaft, an arm pivotally connecting the drive shaft to said stationary housing, the drive shaft being rotatably mounted in said movable housing, a speed-change pulley on the drive shaft externally of the movable housing, a pulley on the drive shaft within the movable housing, a work-engaging member and attached pulley in the movable housing rotatable about the axis of the center head, a belt connecting the pulley on the drive shaft with the pulley attached to the work-engaging member, and means secured to the movable housing and enclosed by the housing for bearing on said belt to maintain the belt under tension.

4. A motor driven headstock comprising a housing having a stationary and a pivotally mounted portion, a center head shaft mounted in said housing, a bearing sleeved on said shaft, a pulley having an elongated sleeve rotatably mounted on the bearing, said bearing and pulley sleeve extending from the movable housing into the stationary housing portion, a washer between the stationary housing and one end of the bearing and pulley sleeve, a washer at the opposite end of the bearing and pulley sleeve, an apertured disc secured to the center head shaft for retaining said washer in position, a work-engaging member secured to the pulley, and means located in the movable housing for driving the pulley.

ALBERT W. WIGGLESWORTH.